United States Patent
Lengrais et al.

(10) Patent No.: US 9,511,795 B2
(45) Date of Patent: Dec. 6, 2016

(54) METHOD FOR CENTERING THE STEERING WHEEL OF A MOTOR VEHICLE POWER-ASSISTED STEERING

(71) Applicant: JTEKT EUROPE, Irigny (FR)

(72) Inventors: Guillaume Lengrais, Lyons (FR); Francois Gassmann, Clerieux (FR); Andre Michelis, Grigny (FR)

(73) Assignee: JTEKT EUROPE, Irigny (FR)

( * ) Notice: Subject to any disclaimer, the term of this patent is extended or adjusted under 35 U.S.C. 154(b) by 0 days.

(21) Appl. No.: 14/412,989

(22) PCT Filed: Jul. 3, 2013

(86) PCT No.: PCT/FR2013/051572
§ 371 (c)(1),
(2) Date: Jan. 5, 2015

(87) PCT Pub. No.: WO2014/006331
PCT Pub. Date: Jan. 9, 2014

(65) Prior Publication Data
US 2015/0151782 A1 Jun. 4, 2015

(30) Foreign Application Priority Data
Jul. 4, 2012 (FR) .................................. 12 56415

(51) Int. Cl.
*B62D 5/04* (2006.01)
(52) U.S. Cl.
CPC .................... *B62D 5/0466* (2013.01)
(58) Field of Classification Search
CPC ...... B62D 5/0466; B62D 5/0463; B62D 5/046
USPC ............................................. 701/41
See application file for complete search history.

(56) References Cited

FOREIGN PATENT DOCUMENTS

| DE | 102004060030 A1 | 6/2006 | |
|---|---|---|---|
| DE | 102010048261 A1 | 4/2012 | |
| EP | 1036727 A1 * | 9/2000 | .......... B62D 5/0466 |
| EP | 1967443 A2 * | 9/2008 | .......... B62D 5/0472 |

(Continued)

OTHER PUBLICATIONS

International Search Report issued Oct. 2, 2013; Application No. PCT/FR2013/051572; citing: EP 1 036 727 A1, DE 10 2010 048261 A1 and DE 10 2004 060030 Al.

Primary Examiner — Aaron L Troost
(74) Attorney, Agent, or Firm — Oliff PLC

(57) ABSTRACT

The invention relates to a method to assist with turning a vehicle power assisted steering wheel, during which method a return setpoint (final return setpoint) quantifying a return force intended to be applied to said steering wheel in order to assist with returning said steering wheel to a predetermined central position is formulated, said method involving at least one step (a) of determining longitudinal acceleration during which step the instantaneous longitudinal acceleration of the vehicle is evaluated, followed by a step (b) of adapting the return setpoint during which step the steering wheel return setpoint is adjusted according to said instantaneous longitudinal acceleration so as to increase the intensity of the return force if said longitudinal acceleration increases, and thus notably compensate for the lessening of the natural centring effect that is caused by the lightening of the steering under acceleration conditions.

8 Claims, 2 Drawing Sheets

(56) References Cited

FOREIGN PATENT DOCUMENTS

JP 2010076594 A * 4/2010

* cited by examiner

METHOD FOR CENTERING THE STEERING WHEEL OF A MOTOR VEHICLE POWER-ASSISTED STEERING

TECHNICAL FIELD

The present invention relates to the general field of the devices and methods for assisting the driving of a motor vehicle, intended to facilitate and secure the maneuver of such a vehicle.

More particularly, it concerns a method for assisting the maneuver of a steering wheel in order to assist the return of said steering wheel toward a predetermined central position, for example within a power-assisted steering system, in particular an electric power-assisted steering.

BACKGROUND

There are known steering assistance systems which, when the steering wheel is turned and the vehicle is moving, return at said steering wheel, in particular via the steering assistance motor, a return force which tends to spontaneously return said steering wheel toward its neutral central position, and this in order to provide the driver with a better feeling of the running conditions.

If returning such a return force is generally satisfactory, by contributing to improve the driving comfort and safety, it may nevertheless suffer from some limitations.

Indeed, the inventors have observed that the known systems might sometimes be caught out, in some situations in which the natural centering phenomenon tends to be alleviated.

This may in particular happen within propulsion vehicles which have a rear-mounted engine, and the steerable front axle of which thus tends to be less solicited, which makes the steering less prone to the spontaneous centering phenomenon.

If such a lack of centering force can be in part compensated, in the steady state, by the caster effect of the front axle, when the latter exhibits a positive caster angle, by steering wheel return common strategies, this does not hold true in the acceleration phase, because of the additional dynamic lightening that said front axle undergoes due to the acceleration.

The sensations of the driver, and more globally the driving assistance, may then be more or less distorted, to the possible detriment of the control of the behavior of the vehicle.

BRIEF SUMMARY

The invention therefore aims at overcoming the aforementioned drawbacks and proposing a new steering assistance method which ensures a control, and in particular a centering, of the steering, that is particularly effective and reliable, and which provides a faithful rendering of the behavior of the vehicle, whatever the life situation of said vehicle is.

The invention provides a method for assisting the maneuver of a vehicle steering wheel, during which a return setpoint is elaborated, quantifying a return force intended to be applied to said steering wheel in order to assist the return of said steering wheel toward a predetermined central position, said method being characterized in that it includes at least one step (a) of determining the longitudinal acceleration during which the instantaneous longitudinal acceleration of the vehicle is evaluated, then a step (b) of adapting the return setpoint during which the steering wheel return setpoint is adjusted depending on said instantaneous longitudinal acceleration.

Advantageously, by dynamically modifying the return force of the steering wheel, and more particularly by intensifying said return force when the acceleration level increases, the method in accordance with the invention allows effectively compensating, in an artificial manner, for the reduction of the actual centering effect caused by the lightening of the steerable front axle.

Thus, said method ensures the continuity and the effectiveness of the centering of the steering wheel, and more globally of the centering of the steering as a whole, and in particular of the steerable wheels, while guaranteeing a good perception of said centering effect, and hence, more broadly, of the behavior of the steerable axle.

It thus provides a better control of the vehicle, more reliable and more intuitive at the same time, whatever are the conditions in which said vehicle is progressing, and in particular during phases of sustained acceleration of the latter.

Said method in accordance with the invention hence allows significantly increasing the comfort and safety of the driving in all circumstances, and this advantageously in a particularly simple and inexpensive manner, without inducing a weighting or a complication of the architecture of the vehicle.

BRIEF DESCRIPTION OF THE DRAWINGS

Other characteristics and advantages of the invention will become apparent in more detail upon reading the following description, with reference to the appended drawings, provided purely by way of illustration and without limitation, among which.

DETAILED DESCRIPTION

The present invention concerns a method for assisting the maneuver of a vehicle steering wheel 1.

Figure 1:
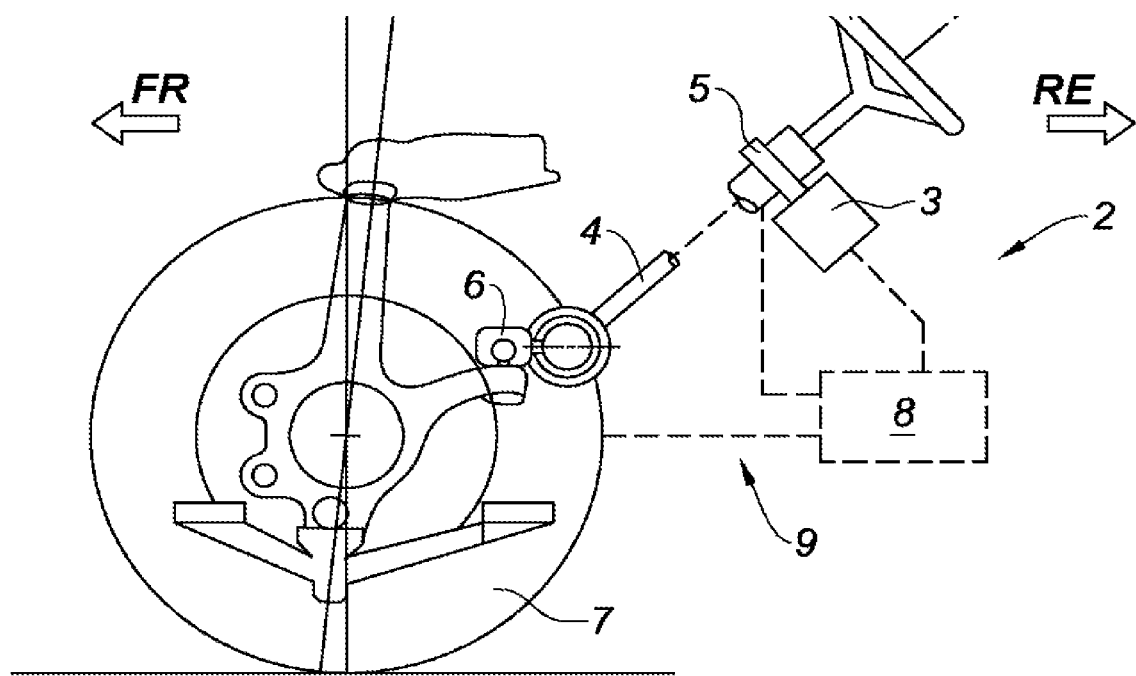
FIG. 1 illustrates, according to a schematic side view, a positive caster vehicle equipped with a steering assistance system allowing implementing a method in accordance with the invention.

Said method finds its application in particular, as it is illustrated in FIG. 1, within a power-assisted steering system 2, preferably using an electric assistance motor 3, for example coupled to the steering column 4 by a reducer 5 of the worm wheel and worm type.

Conventionally, the rotation of the column 4 preferably drives a pinion which meshes on a rack (not visible) mounted in translation in a casing, which rack in turn acts on left and right tie rods 6, to direct the wheels 7 of the steerable axle. In this example, it is the front axle, which preferably exhibits a positive caster angle $\theta$.

The power-assisted steering system 2 will preferably include an embedded calculator 8, designed to drive the assistance motor 3, and more particularly to apply to said motor a setpoint corresponding to a torque which promotes or on the contrary resists to the maneuver of the steering wheel 1, according to one or several predetermined assistance law(s).

The data exchanges toward and from said calculator 8 might advantageously be ensured by an on-board computer network 9, of the CAN (Controller Area Network) kind.

During the method in accordance with the invention, it is in particular necessary to develop a return setpoint ("final return setpoint" in FIG. 2) which quantifies a return force, and more particularly a torque, intended to be applied to the steering wheel 1, if appropriate via an assistance motor 3 to which said setpoint will be applied then via the steering column 4 coupled to said motor, and this in order to assist the return of said steering wheel 1 toward a predetermined central position.

Although said predetermined central position may be freely defined, it preferably corresponds substantially to the neutral position of the steering wheel, that is to say a configuration of the steering system in which the wheels of the steerable running axle are directed in a straight line, along the front FR—rear RE longitudinal direction of the vehicle.

Moreover, the term "steering wheel", used for convenience, is in no way restrictive, and may refer here to any device allowing the driver of the vehicle to exert a control force on the steering, such as a conventional annular steering wheel, possibly truncated on one portion of its perimeter, a steering tiller, a joystick-type handle, a rudder pedal assembly, etc.

Figure 2:
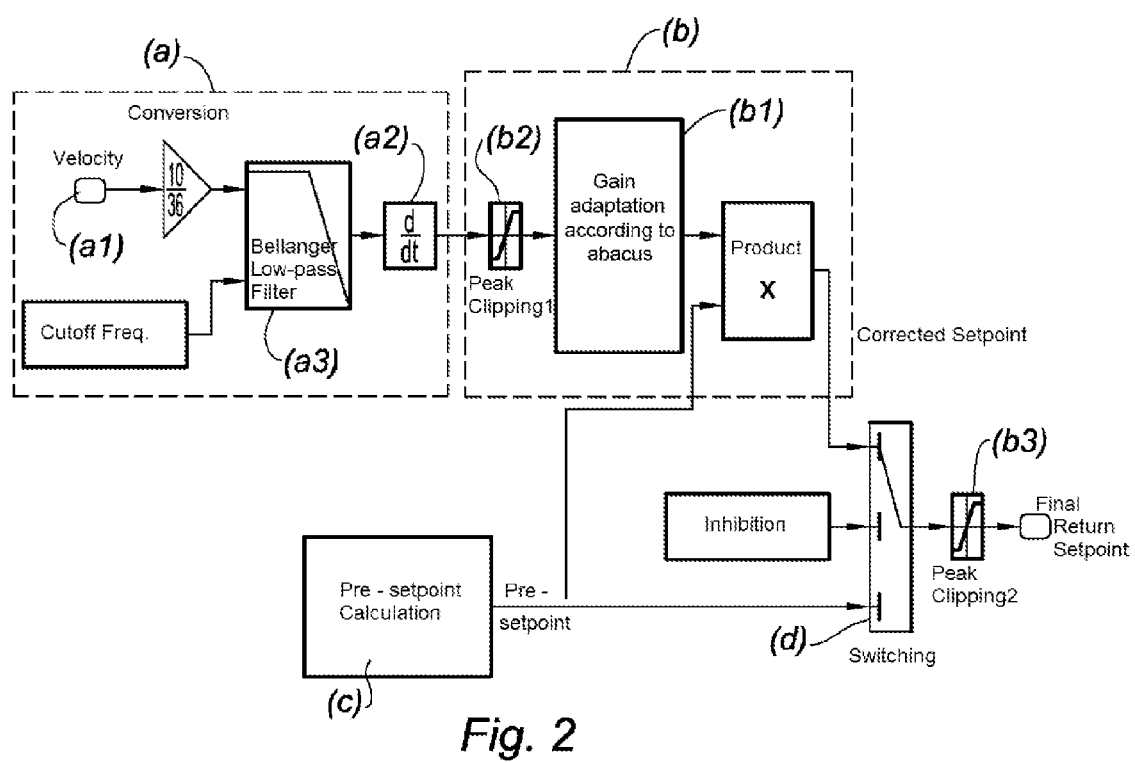
FIG. 2 illustrates, according to a functional block diagram, the progress of a method for compensating the steering wheel centering in accordance with the invention.

According to the invention, and as it is illustrated in FIG. 2, the method includes at least one step (a) of determining the longitudinal acceleration during which the instantaneous longitudinal acceleration of the vehicle is evaluated, then a step (b) of adapting the return setpoint during which the steering wheel return setpoint is adjusted depending on said instantaneous longitudinal acceleration.

Advantageously, such a method allows taking into consideration, substantially in real-time, the longitudinal acceleration parameter of the vehicle, that is to say the acceleration component which is carried by the front-rear direction of said vehicle and which is in principle substantially tangent to the followed trajectory, so as to adapt and dose the return force applied to the steering wheel in response to the steering of the latter, that is to say when said steering wheel is turned in a angular position which is distinct and more or less away from said steering wheel's predetermined central position.

More particularly, said method allows reinforcing the driver's perception of the centering effect, as well as the effective centering action of the steering wheel 1, and more globally of the effective centering action of the steering and the running axle, when the vehicle accelerates.

Thus, it is in particular possible to artificially and effectively compensate and correct the dynamic lightening effect to which the front axle of vehicles may be prone, in particular the vehicles whose engine is rear-mounted, such as light, rear wheel drive vehicles.

If appropriate, this intervention of the acceleration value in the definition of the centering force might be applied in both displacement directions, whether the vehicle is progressing forward or rearward.

Preferably, during the adaptation step (b), the return setpoint is adjusted according to an increasing function of the longitudinal acceleration, so as to increase the intensity of the return force if said longitudinal acceleration increases and/or if said longitudinal acceleration exceeds a predetermined threshold.

In other words, it is possible to advantageously benefit from a progressive reinforcement of the centering force, and in particular from an active and progressive compensation of the diminution of the centering force, said diminution resulting from the reduction of the natural centering effect caused by the dynamic lightening of the steerable running axle, said compensation may be operated according to a law which might be increasing with the acceleration, either continuously, and in particular linearly, or piecewise (and in particular stepped).

Moreover, a triggering threshold of the compensation might in particular be provided, the complementary artificial reinforcement of the return force being involved only from a first predetermined acceleration level (lower value).

Similarly, it is possible to consider, in particular for safety reasons in order to avoid an over-compensation, upper-limiting the reinforcement of the return force, when the instantaneous longitudinal acceleration reaches or exceeds a second predetermined level (upper value), greater than the first level.

Preferably, the adaptation step (b) comprises a variable amplification sub-step (b1) during which is associated to the instantaneous acceleration value, according to a pre-established law or abacus, an amplification gain which varies depending on said acceleration value, then said gain is applied to a base signal forming a pre-setpoint, so as to obtain a corrected setpoint.

Preferably, said pre-setpoint is in turn calculated independently from the longitudinal acceleration, during a pre-setpoint calculation step (c), on the basis of one or several (other) running parameter(s) such as the velocity of the vehicle, the rotational velocity of the steering wheel, the angular position of the steering wheel and/or the torque exerted by the driver on the steering wheel.

Moreover, whatever the retained embodiment is, the pre-setpoint and/or the corrected setpoint might be defined while taking into account in particular of the angular position of the steering wheel, and in particular the more the steering of the steering wheel is marked, that is to say the more the instantaneous angular position of said steering wheel is away from its central position, then the higher said pre-setpoint and/or corrected setpoint might be.

Advantageously, the invention allows very easily adapting the return setpoint, according to a proportional-type correction, by multiplying the pre-setpoint by an amplification gain which is modified in particular according to the instantaneous acceleration value, based on a predetermined scale such as a curve, a mapping (<<map>>) or an abacus, advantageously stored in a non-volatile memory of the calculator 8.

In one embodiment example, said gain might be strictly greater than 1, and reaches 5 or more.

Preferably, the pre-setpoint and the corrected setpoint, as well as the final setpoint, will be signals of the same nature, for example "return currents" the intensity of which is representative of the return torque that should be exerted by the assistance motor 3.

It is also remarkable that the pre-setpoint calculation step (c) may correspond to an already existing step within a steering assistance method of known type, the implementation of the invention may thus be applied by a simple retrofitting "graft", on the existing architecture, of programming modules corresponding to the acceleration determination step (a) and the setpoint adaptation step (b), in order to perform the conditional amplification of the base setpoint, such as a "return current", which is invariant whatever the longitudinal acceleration is, and which is already provided from the existing steering assistance system on the existing on-board network 9.

More globally, it is hence particularly easy and inexpensive to implement the invention, which may ultimately mean providing a modification of the proportional gain, according to an increasing function of the acceleration, in a control loop of the return of the steering wheel which may still be already implanted on the considered vehicle.

Preferably, the method, and more particularly the adaptation step (b), comprises a first peak clipping sub-step (b2) during which the pre-setpoint signal is peak clipped, to a first predetermined saturation threshold, before determination of the amplification gain, and/or a second peak clipping sub-step (b3) during which the corrected setpoint signal is peak clipped, to a second predetermined saturation threshold, after amplification.

Advantageously, such an upper limiting of the signals allows increasing the magnitude of the compensation brought to the setpoint and/or the intensity of the final setpoint, and consequently setting a limit to the return force that is actually applied.

We thus avoid in particular, by a safety restriction of the adaptation function, of the <<high value>> type, any risk of error or risk of excess in the correction and more globally any risk of incident in the assistance to the driving; thus in particular the occurrence of a possible over-compensation is avoided, which would be likely to either hinder the maneuver of the steering wheel or cause random automatic maneuvers of said steering wheel.

Preferably, the method moreover comprises a switching step (d) allowing selectively activating or on the contrary inhibiting the setpoint adaptation step (b).

More particularly, as it is illustrated in FIG. 2, it is possible to consider a switching between three possible processing configurations:
  a first configuration (at the top of the switcher in FIG. 2) corresponding to applying the corrected setpoint, that is to say activating or at least taking into consideration the adaptation step (b) of the setpoint depending on the longitudinal acceleration,
  a second position (down the switcher in FIG. 2) corresponding to the direct application, without adaptation, of the pre-setpoint, which is used as such to define the return force, without influence of the longitudinal acceleration,
  a third position (intermediate in FIG. 2) allowing totally inhibiting the return function, in some particular cases where the installer or the user of the power-assisted steering system decides so.

The activation switching of the adaptation step (b), and more particularly the alternating selection between an "ordinary" return by a pre-setpoint or an adapted "return" by a corrected setpoint, to take into account the longitudinal acceleration, might possibly be automatic, and in particular controlled by the detection of the crossing of an acceleration threshold, and more particularly of a low acceleration value below which the natural centering effect is considered to be significant and perceptible enough to not require amplification, and beyond which in contrast it is preferable to adapt the setpoint by amplifying said setpoint.

Moreover, it will be noted that, as a precaution, the restriction provided by the second peak clipping step (b3) may advantageously be common to the different aforementioned configurations, that is to say systematically applied, downstream of the switching, whatever the origin of the (base or corrected) setpoint signal is, so as to be able to systematically secure the final return setpoint sent to the assistance motor.

Of course, any acquisition method may be considered in order to determine the longitudinal acceleration, for example a direct measurement by means of a specific sensor of the type inertial accelerometer, or an indirect evaluation, by any appropriate kinematic or dynamic calculation, from one or several running parameter(s).

Preferably, the step (a) of determining the longitudinal acceleration will include to this end a sub-step (a1) of acquiring the longitudinal velocity of the vehicle, then a sub-step (a2) of calculating the derivative of said velocity.

Advantageously, it is thus possible to determine, by means of an operation very simple to be programmed, the acceleration parameter which serves as an assessing and quantifying criterion for the adaptation of the return setpoint, and this, furthermore, on the basis of a signal representing the velocity which is already available on the CAN 9 network, since it has been measured or calculated by another/other system(s) embedded on the vehicle.

In particular, the longitudinal velocity, or linear velocity, of the vehicle might be notably assessed for example by a speedometer-type sensor placed at the gearbox output, or furthermore, in a particularly preferred way, by the wheels velocity monitored by an anti-lock braking system ABS, without it being necessary to implant an additional dedicated sensor.

If appropriate, the signal representative of the velocity might be converted or normalized, for example by multiplying by a $10/36$ factor to express in m/s the value of said signal initially provided in km/h Preferably, the step (a) of determining the longitudinal acceleration moreover includes a filtering sub-step (a3), which precedes the derivative calculation sub-step (a2), and during which the signal representative of the velocity of the vehicle is filtered by means of a low-pass filter, such as a second-order Bellanger filter, preferably with an adjustable cutoff frequency (Cutoff Freq.).

Advantageously, such a filtering allows eliminating the noise corresponding to the high frequencies, located beyond the cutoff frequency, a noise which would be likely to distort the estimation of the longitudinal acceleration value by derivation, and thereby, generate an error in the correction applicable, for example by inducing an over-compensation.

The possibility of adjusting one or more characteristic(s) of the filter, and in particular the cutoff frequency, if appropriate in a dynamic manner, advantageously allows optimizing the accuracy of the acceleration determination.

Moreover, according to a preferred feature which may constitute an invention in its own right, it is possible, during the adaptation step (a), to also take into consideration the measured or estimated value of the lateral acceleration of the vehicle for adjusting the return setpoint.

Thus, it is possible for example to detect the crossing of a lateral acceleration threshold, or even take into consideration the quotient of the longitudinal acceleration by the lateral acceleration, and this, for example, in order to limit or reduce the return setpoint if the lateral acceleration increases during the longitudinal acceleration phase of the vehicle, which indicates, in principle, that the vehicle is actually engaged in a turn.

It is also possible to limit or even restrict the return force if the vehicle undergoes a high lateral acceleration (of the centrifugal force type), in particular beyond a predefined threshold, and this in particular in order to improve the feeling of the driver at the steering wheel 1, by making this feeling more "linear".

Ultimately, the adjustment of the return setpoint might take into consideration two acceleration parameters, and more particularly the acceleration longitudinal component and the transverse component of said acceleration, normal to the preceding one, such a particularly full consideration contributing to refine the steering assistance law.

Of course, the invention is in no way limited to a particular alternative embodiment, those skilled in the art having in particular the possibility to isolate or combine together the different characteristics described above.

Moreover, the present invention also concerns, of course, a motor vehicle, and in particular a land motor vehicle intended for individual or collective transportation of people or goods, which embeds a calculator 8, such as an electronic module, arranged or programmed to implement a method as described above.

Finally, the invention concerns a computer program containing code elements of a computer program allowing the implementation of a method in accordance with the invention when said program is executed on a calculator, as well as a data medium readable by a calculator, such as a disk, a flash memory, a USB key, etc. containing code elements of a computer program allowing the implementation of such a method when said medium is read by a calculator.

The invention claimed is:

1. A method for assisting maneuvering of a vehicle steering wheel, during which a return setpoint is adjusted, the return setpoint quantifying a return force intended to be applied to said steering wheel in order to assist a return of said steering wheel toward a predetermined central position, said method comprising: a step (a) of determining a longitudinal acceleration during which an instantaneous longitudinal acceleration of the vehicle is evaluated, then a step (b) of adapting the return setpoint during which the steering wheel return setpoint is adjusted depending on said instantaneous longitudinal acceleration, according to an increasing function of the longitudinal acceleration, so as to increase an intensity of the return force when at least one of said longitudinal acceleration increases and said longitudinal acceleration exceeds a predetermined threshold.

2. The method according to claim 1 wherein, the adapting step (b) comprises a variable amplification sub-step (b1) during which is associated to the instantaneous acceleration value, according to a pre-established law or map, an amplification gain which varies depending on said acceleration value, then said gain is applied to a base signal forming a pre-setpoint, said pre-setpoint being calculated independently from the longitudinal acceleration, on the basis of one or several running parameter(s) comprising at least one of a velocity of the vehicle, a rotational velocity of the steering wheel, an angular position of the steering wheel and a torque exerted by the driver on the steering wheel, so as to obtain a corrected base signal forming a corrected setpoint.

3. The method according to claim 2 wherein the adapting step (b) comprises at least one of a first peak clipping sub-step during which the base signal forming the pre-setpoint is peak clipped, to a first predetermined saturation threshold, before determination of the amplification gain, and a second peak clipping sub-step during which the corrected base signal is peak clipped, to a second predetermined saturation threshold, after amplification.

4. The method according to claim 1 further comprising a switching step (d) allowing selectively activating or inhibiting the setpoint adapting step (b).

5. The method according to claim 1 wherein the step (a) of determining the longitudinal acceleration includes a sub-step (a1) of acquiring a longitudinal velocity of the vehicle, then a sub-step (a2) of calculating the derivative of said longitudinal velocity.

6. The method according to claim 5 wherein the step (a) of determining the longitudinal acceleration includes a filtering sub-step (a3), which precedes the derivative calculation sub-step (a2), and during which the signal representative of the longitudinal velocity of the vehicle is filtered by means of a low-pass filter.

7. The method according to claim 1 wherein, during the adapting step (b), a measured or estimated value of a lateral acceleration of the vehicle is also taken into consideration for adjusting the return setpoint.

8. A motor vehicle wherein embeds a calculator arranged or programmed to implement a method for assisting maneuvering of a vehicle steering wheel during which a return setpoint is adjusted, the return setpoint quantifying a return force intended to be applied to said steering wheel in order to assist a return of said steering wheel toward a predetermined central position, said method comprising a step (a) of determining a longitudinal acceleration during which an instantaneous longitudinal acceleration of the vehicle is evaluated, then a step (b) of adapting the return setpoint during which the steering wheel return setpoint is adjusted depending on said instantaneous longitudinal acceleration, according to an increasing function of the longitudinal acceleration, so as to increase an intensity of the return force when at least one of said longitudinal acceleration increases and said longitudinal acceleration exceeds a predetermined threshold.

* * * * *